(12) United States Patent
Davis

(10) Patent No.: US 8,834,095 B2
(45) Date of Patent: Sep. 16, 2014

(54) INTEGRAL BEARING SUPPORT AND CENTERING SPRING ASSEMBLY FOR A GAS TURBINE ENGINE

(75) Inventor: Todd A. Davis, Tolland, CT (US)

(73) Assignee: United Technologies Corporation, Hartford, CT (US)

( * ) Notice: Subject to any disclaimer, the term of this patent is extended or adjusted under 35 U.S.C. 154(b) by 608 days.

(21) Appl. No.: 13/167,798

(22) Filed: Jun. 24, 2011

(65) Prior Publication Data

US 2012/0328431 A1 Dec. 27, 2012

(51) Int. Cl.
*F01D 25/16* (2006.01)

(52) U.S. Cl.
CPC ............. *F01D 25/164* (2013.01); *Y02T 50/671* (2013.01)
USPC .......................... 415/112; 415/171.1; 415/229

(58) Field of Classification Search
USPC ................................ 415/112, 171.1, 175, 229
See application file for complete search history.

(56) References Cited

U.S. PATENT DOCUMENTS

| 2,862,356 | A | * | 12/1958 | Kent et al. ...................... 60/791 |
| 4,084,861 | A | * | 4/1978 | Greenberg et al. .............. 384/99 |
| 4,453,784 | A | * | 6/1984 | Kildea et al. ................... 384/472 |
| 4,693,616 | A | * | 9/1987 | Rohra et al. ..................... 384/99 |
| 4,744,214 | A | | 5/1988 | Monsarrat et al. |
| 4,872,767 | A | * | 10/1989 | Knapp ............................. 384/99 |
| 4,934,140 | A | | 6/1990 | Dennison et al. |
| 5,433,584 | A | * | 7/1995 | Amin et al. .................... 415/229 |
| 5,603,602 | A | * | 2/1997 | Romani ......................... 415/105 |
| 6,082,959 | A | * | 7/2000 | Van Duyn ......................... 415/9 |
| 6,413,046 | B1 | * | 7/2002 | Penn et al. ....................... 416/1 |
| 6,443,698 | B1 | * | 9/2002 | Corattiyil et al. ................. 416/1 |
| 6,783,319 | B2 | * | 8/2004 | Doerflein et al. ................ 415/1 |
| 7,097,412 | B2 | * | 8/2006 | DiTomasso ....................... 415/9 |
| 7,097,415 | B2 | * | 8/2006 | Bart et al. ........................ 415/69 |
| 7,384,199 | B2 | * | 6/2008 | Allmon et al. ................. 384/581 |
| 8,104,972 | B2 | * | 1/2012 | Maguire ........................ 384/556 |
| 8,360,714 | B2 | * | 1/2013 | Otto et al. .................. 415/124.2 |
| 8,366,385 | B2 | * | 2/2013 | Davis et al. ................. 415/124.2 |
| 8,511,986 | B2 | * | 8/2013 | Alvanos et al. ............ 415/216.1 |
| 8,511,987 | B2 | * | 8/2013 | Reinhardt et al. ............ 415/229 |
| 2006/0083448 | A1 | * | 4/2006 | Alam et al. ....................... 384/99 |
| 2008/0148707 | A1 | * | 6/2008 | Schilling .................... 60/39.162 |
| 2009/0103843 | A1 | * | 4/2009 | Maguire ........................ 384/420 |
| 2011/0286836 | A1 | * | 11/2011 | Davis .......................... 415/170.1 |
| 2012/0328431 | A1 | * | 12/2012 | Davis ............................. 415/229 |
| 2013/0195646 | A1 | * | 8/2013 | Merry et al. .................... 415/229 |

* cited by examiner

*Primary Examiner* — Edward Look
*Assistant Examiner* — Christopher R Legendre
(74) *Attorney, Agent, or Firm* — Kinney & Lange, P.A.

(57) ABSTRACT

A bearing support assembly for supporting a bearing assembly within a bearing compartment of a gas turbine engine includes a centering spring and a bearing support member integrally joined together to form a one piece structure. The centering spring connects to the bearing assembly and has a portion that extends conically relative to a centerline axis of the gas turbine engine. The bearing support member extends from the centering spring to connect to an engine case of the gas turbine engine.

15 Claims, 2 Drawing Sheets

INTEGRAL BEARING SUPPORT AND CENTERING SPRING ASSEMBLY FOR A GAS TURBINE ENGINE

BACKGROUND

The present invention relates to gas turbine engines, and more particularly, to an integral bearing support member and centering spring assembly.

The rotating shafts and other rotating turbomachinery of gas turbine engines are supported from a non-rotating structure by arrays of anti-friction bearings. In many engines, anti-friction bearings are enclosed in bearing compartments that allow the anti-friction bearings to be more easily lubricated and cooled.

Many bearing compartments, especially those located in the forward portions of gas turbine engines, have small profiles that make their interiors small and difficult to access for component assembly, routine maintenance, and repair. To support the anti-friction bearings within the bearing compartments, an outer race of the anti-friction bearings is typically press fit into a centering spring, which in turn is fastened to a bearing support member. The bearing support member is connected to a static casing of the gas turbine engine.

The aforementioned arrangement holds the centerline of the gas turbine engine in an appropriate position and allows for load and vibration transfer from the rotating shafts and other rotating machinery to the stator case of the gas turbine engine. Unfortunately, conventional centering springs and bearing support members are costly to fabricate as multiple parts must be sized and machined. For example, with the conventional configuration, centering springs must be machined to include a flange "kink" that turns 90° relative to the remainder of the centering spring. In addition to adding machining operations to the fabrication process, the flange "kink" comprises a region of stress concentration and has been known to deflect axially relative to a centerline of the gas turbine engine, which is not optimal.

SUMMARY

A bearing support assembly for supporting a bearing assembly within a bearing compartment of a gas turbine engine includes a centering spring and a bearing support member integrally joined together to form a one piece structure. The centering spring connects to the bearing assembly and has a portion that extends conically relative to a centerline axis of the gas turbine engine. The bearing support member extends from the centering spring to connect to an engine case of the gas turbine engine.

In another aspect, a gas turbine engine includes a bearing compartment and a one-piece bearing support assembly. The bearing compartment is disposed within the gas turbine engine and houses a bearing assembly therein. The bearing support assembly is comprised of a bearing support member integrally joined with the centering spring. The centering spring has both a portion that extends conically relative to a centerline axis of the gas turbine engine and a main body that contacts and extends generally axially along the bearing assembly.

DETAILED DESCRIPTION

The present application describes an integral bearing support assembly that serves as both a bearing support member and a centering spring for a gas turbine engine. The integral assembly reduces the part count of the gas turbine engine, and thereby, can reduce the size and weight of the engine. Additionally, the integral assembly reduces costs and simplifies fabrication by reducing the number of parts and by eliminating features such as a flange of the centering spring associated with the prior art. The integral assembly has improved stiffness and tolerances. Additionally, the integral assembly provides for a smooth transition along its extent. This allows for an optimized load path that reduces radial deflection of the integral assembly. The improved load path allows the overall length of the gas turbine engine to be reduced.

Figure 1:
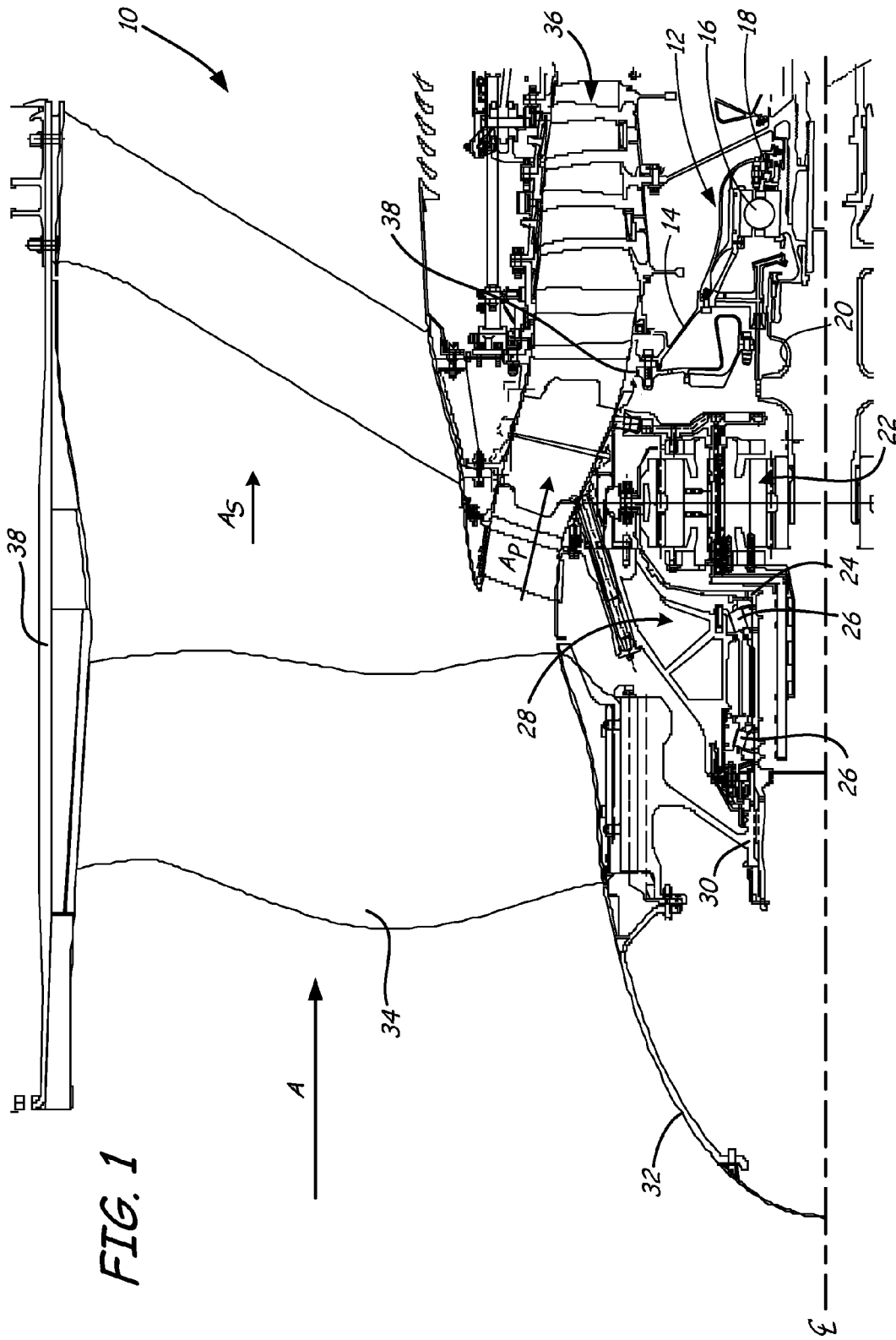
FIG. 1 is a schematic cross-section of a forward portion of a gas turbine engine.

FIG. 1 shows a forward section of a gas turbine engine 10 illustrated above engine centerline $C_L$. Gas turbine engine 10 includes a bearing compartment 12, a bearing support assembly 14, a bearing assembly 16, a carbon seal assembly 18, a engine shaft 20, a fan drive gear system 22, a fan shaft 24, a forward bearing assembly 26, a forward bearing compartment 28, a fan hub 30, a fan nose 32, fan blades 34, a compressor section 36, and a engine case 38.

Bearing compartment 12 is disposed adjacent engine shaft 20 and houses bearing assembly 16 therein. Bearing compartment 12 is bounded by engine shaft 20, bearing support assembly 14, and carbon seal assembly 18. Engine shaft 20 rotates about an axis that aligns with engine centerline axis $C_L$ and is supported on bearing assembly 16. Bearing assembly 16 is connected to and supported by bearing support assembly 14 which connects to stator portions of gas turbine engine 10. More particularly, bearing support assembly 18 extends to connect to a non-rotational frame such as engine case 38 of gas turbine engine 10.

Engine shaft 20 connects to fan shaft 24 via fan drive gear system 22. Fan shaft 24 is supported by forward bearing assembly 26 which is disposed in forward bearing compartment 28. Fan hub 30 connects to fan nose 32 and also connects to and turns fan blades 34 through fan hub 30. Compressor section 36 is disposed radially outward of engine centerline $C_L$ and is connected to engine shaft 28. Compressor section 36 is bounded by engine case 38.

The operational principles of gas turbine engine 10 are well known in the art, and therefore, will not be discussed in great detail. As illustrated in FIG. 1, gas turbine engine 10 comprises a high bypass ratio geared turbofan engine. In other embodiments, gas turbine engine 10 can comprise another type of gas turbine engine used for aircraft propulsion or power generation.

Fan shaft 24 and compressor section 36 are connected to a turbine section (not shown) through engine shaft 20. Inlet air A enters engine 10 whereby it is divided into streams of a primary air $A_P$ and a secondary air $A_S$ after passing through the fan blades 34. The fan blades 34 are rotated by turbine section (not shown) of engine 10 through engine shaft 20 to accelerate the secondary air $A_S$ (also known as bypass air) through exit guide vanes 34, thereby producing a significant portion of the thrust output of engine 10. The primary air $A_P$ (also known as gas path air) is directed into compressor section 36. Compressor section 36 works to incrementally increase the pressure and temperature of primary air $A_P$.

Figure 2:
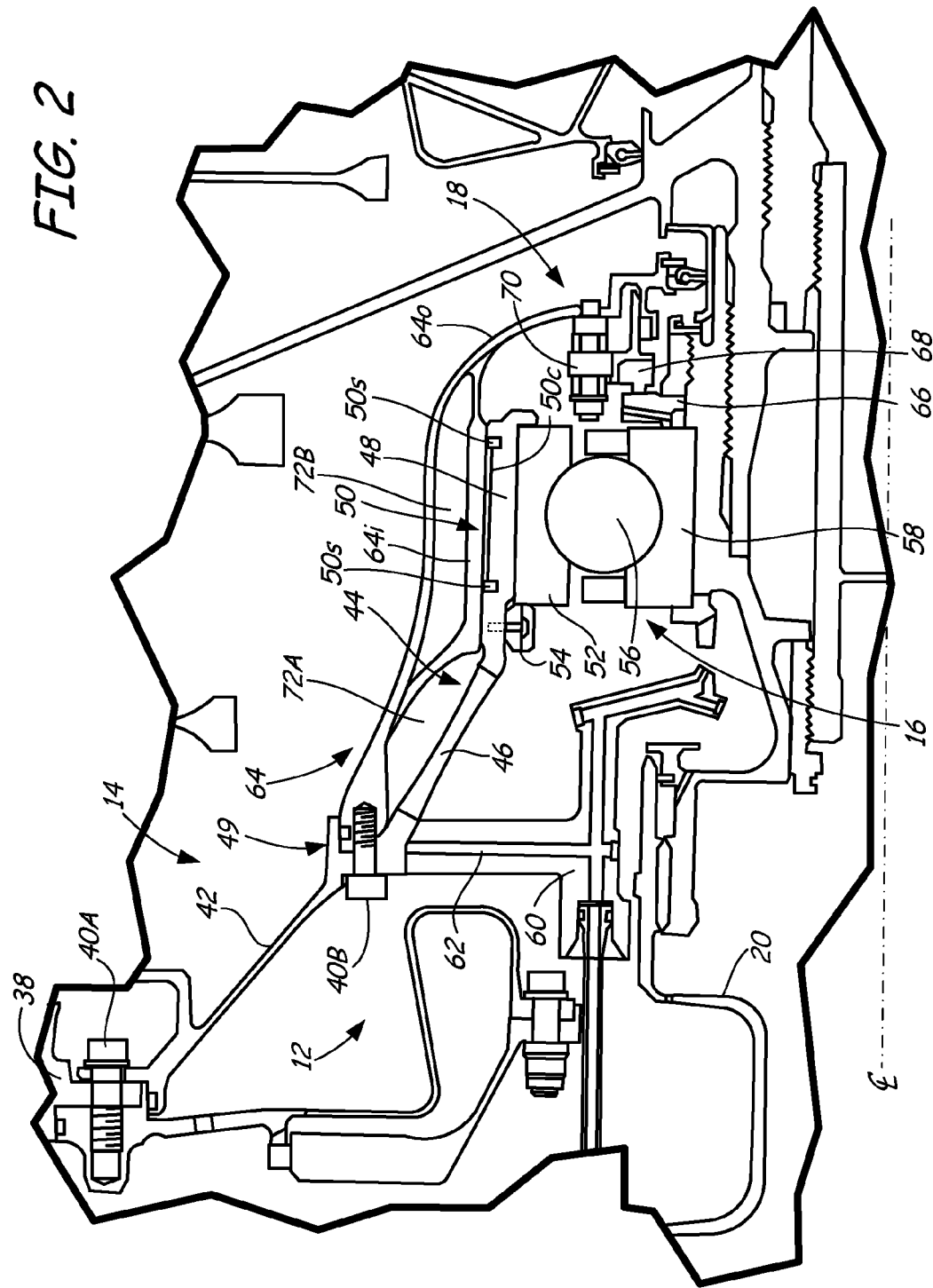
FIG. 2 is a schematic cross-sectional view of a bearing compartment and a one-piece bearing support assembly that extends from an engine case to support a bearing assembly.

FIG. 2 shows a cross-sectional view of bearing compartment 12, bearing support assembly 14, bearing assembly 16, and carbon seal assembly 18. Bearing support assembly 14 includes fasteners 40A and 40B, a bearing support member 42, and a centering spring 44. The centering spring 44 includes beams 46 (only one of which is illustrated in FIG. 2), a main body 48, and a squeeze film damper 50. Bearing assembly 16 includes outer race 52, nut 54, ball 56, and inner race 58. Bearing compartment 12 includes an oil jet 60 with a passage 62. Carbon seal assembly 18 includes a seal housing 64, a carbon seal seat 66, a carbon seal 68, a bias element 70, and lubricant passages 72A and 72B.

Fastener 40A is received by holes in bearing support member 42 and engine case 38 and connects bearing support member 42 to engine case 38. As part of bearing support assembly 14, bearing support member 42 extends from engine case 38, is generally aligned with and transitions to become centering spring 44. Thus, bearing support assembly 14 comprises a one-piece assembly where bearing support member 42 is integrally joined with centering spring 44 (which comprises beams 46 and main body 48) making a smooth transition therebetween. Centering spring 44 and bearing support member 42 can be integrally joined by machining a single piece stock, forging, casting, or welding, for example.

Fastener 40B is received by holes in an intermediate connection section 49 of bearing support assembly 14. Intermediate connection section 49 comprises the connection point between bearing support assembly 14 and carbon seal assembly 18. Fastener 40B connects bearing support assembly 14 to carbon seal assembly 18. The portion of centering spring 44 adjacent fastener 40B comprises a plurality of beams 46 (only one of which is illustrated in FIG. 2). Each beam 46 is disposed diagonally so as to extend conically away from intermediate connection section 49 relative to the centerline axis $C_L$ of the gas turbine engine 10. Thus, each beam 46 has both radial and axial extent relative to the centerline axis $C_L$ and is generally aligned with the support member 42 which also extends conically relative to the centerline axis $C_L$. Each beam 46 provides a transition from support member 42 to main body 48. Although not shown in FIG. 2, beams 46 are circumferentially spaced apart from one another and are disposed annularly about bearing compartment 12. Main body 48 is configured to extend generally axially with respect to engine centerline $C_L$ and contact, receive, and support outer race 52 of bearing assembly 16.

Squeeze film damper 50 comprises a cavity 50c that is disposed between main body 48 and seal housing 64. Squeeze film damper 50 is bordered by axially set apart seals 50s. Inner diameter surface of main body 48 of centering spring 44 has threads that receive the threaded outer diameter of nut 54, or similar fastening attachment therein. Nut 54 contacts a forward portion of outer race 52 and holds outer race 52 in a desired position relative to centering spring 44 and other components of gas turbine engine 10. Nut 54 can be removed for assembly and repair of bearing assembly 16 and bearing support assembly 14.

Outer race 52 has an arcuate shape and is disposed about engine centerline $C_L$. The inner surface of outer race 52 is shaped to receive a plurality of balls 56 therein (only a single ball 56 is illustrated in the section shown in FIG. 2). Ball 56 is also received by the outer surface of inner race 58. Inner race 58 is disposed on engine shaft 20 adjacent carbon seal seat 66, carbon seal 68, and bias element 70 of carbon seal assembly 18.

Oil jet 60 extends within bearing compartment 12 adjacent engine shaft 20. Oil jet 60 is a static assembly that connects with static bearing support assembly 14, and in particular, centering spring 44. Oil jet 60 contains passage 62 which communicates lubricant that eventually reaches squeeze film damper 50. More particularly, in one embodiment oil jet 60 communicates with passages (not shown) in seal housing 64 via a jumper tube (not shown) that allow for the circulation of oil to cavity 50C of squeeze film damper 50 between the inner radial portion 64i of seal housing 64 and the outer radial surface of main body 48 of centering spring 44. In other embodiments, oil jet 60 and/or jumper tube can extend to communicate more directly with squeeze film damper 50 through bearing support assembly 14 and seal housing 64.

Static seal housing 64 comprises a portion of carbon seal assembly 18 and has an arcuate outer radial portion 64o that is connected to bearing support assembly 14 by fastener 40B. Arcuate outer portion 64o of seal housing 64 extends around bearing assembly 16 and connects to the remainder of bearing assembly 18. Outer portion 64o forms portions of lubricant passages 72A and 72B. Inner radial portion 64i of seal housing 64 is integrally connected to outer portion 64o and contacts and interfaces (and forms part of cavity 50c that is part of squeeze film damper 50) with main body 48. Thus, inner radial portion 64i has a generally axial extent relative to the engine 10 centerline $C_L$. Bias element 70, in one embodiment a spring, contacts and exerts a desired axial (in other embodiments radial) force on stator carbon seal 68, which interfaces with rotating carbon seal seat 66. The force exerted by bias element 70 on carbon seal 68 allows a desired amount of air to flow between carbon seal 68 and carbon seal seat 66 into bearing compartment 12. This arrangement keeps lubricant inside bearing compartment 12. Seal housing 64 also has lubricant passages 72A and 72B that scavenge oil away from bearing compartment 12 by providing a drain path for lubricant to be carried away from the bearing compartment to appropriate lubricant collection and transport apparatuses (not shown).

Bearing support assembly 14 supports and maintains the position of the outer race 52 relative engine shaft 20, inner race 58, and balls 56. Bearing support assembly 14 has a spring rate capable of reacting loads to engine case 38 from engine shaft 20 via bearing assembly 16. The spring rate of centering spring 44 (and thus bearing support assembly 14) can be adjusted and optimized as desired by selecting the number, size, and shape of beams 46. Additionally, squeeze film damper systems such as the one disclosed herein are well known in the art and are used to shift critical speeds and/or to increase the dynamic stability of a rotor-bearing system. In particular, as shown in FIG. 2 squeeze film damper 50 provides damping to bearing assembly 16 to damp vibrations in engine shaft 20 using a pressurized damping lubricant, in most instances oil. As previously explained, the lubricant is pressurized and transported to bearing compartment 12 where, as previously explained, it is communicated by oil jet 60, jumper tube, and other passages in seal housing 64 to squeeze film damper 50.

Although the invention was illustrated adjacent a forward bearing compartment of gas turbine engine 10, the invention can be used to support bearing assemblies in any location within gas turbine engine 10. Additionally, while the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A gas turbine engine including a one-piece bearing support assembly for supporting a bearing assembly within a bearing compartment, comprising:
   a bearing support member comprising an upper connection section configured to connect to an engine case of the gas turbine engine;
   a centering spring integrally joined with the bearing support member opposite the upper connection section, the centering spring comprising:
      a portion that extends conically relative to a centerline axis of the gas turbine engine; and
      a cylindrical main body that extends axially from the portion that extends conically and is configured to connect to an outer race of the bearing assembly,
      wherein the portion that extends conically comprises at least one beam that extends conically between the cylindrical main body and the bearing support member; and
   an intermediate connection section disposed between the at least one beam and the bearing support member, wherein the intermediate connection section is configured to be connected to a seal housing having an outer radial arcuate portion that extends around the bearing assembly.

2. The gas turbine engine of claim 1, wherein the at least one beam is generally aligned with the bearing support member.

3. The gas turbine engine of claim 2, wherein a stiffness of the at least one beam is determined by a number, a size, and a shape.

4. The gas turbine engine of claim 1, further comprising a squeeze film damper disposed radially outward of the bearing assembly between the cylindrical main body of the centering spring and an inner portion of the seal housing.

5. The gas turbine engine of claim 1, wherein the centering spring and bearing support member are integrally joined by machining a single piece stock, by forging, by casting, or by welding.

6. The gas turbine engine of claim 1, wherein an outer race of the bearing assembly is press fit into the centering spring and is held in place by a nut that fastens to the centering spring and contacts the outer race.

7. An assembly for supporting and housing a bearing assembly within a bearing compartment of a gas turbine engine, comprising:
   a centering spring having at least one beam that extends conically relative to a centerline axis of the gas turbine engine and a main body that connects to the bearing assembly;
   a bearing support member integrally joined and generally aligned with the centering spring and extending to connect to an engine case of the gas turbine engine;
   a carbon seal assembly that connects to the bearing support assembly, wherein the carbon seal assembly includes an arcuate seal housing that extends around the bearing assembly; and
   a squeeze film damper disposed radially outward of the bearing assembly between the centering spring and an inner portion of the seal housing.

8. The assembly of claim 7, wherein a stiffness of the at least one beam is determined by a number, a size, and a shape.

9. The assembly of claim 7, wherein the centering spring and bearing support member are integrally joined by machining a single piece stock, by forging, by casting, or by welding.

10. The assembly of claim 7, wherein the at least one beam is generally aligned with the bearing support member.

11. A gas turbine engine, comprising:
    a bearing compartment disposed within the gas turbine engine, the bearing compartment housing a bearing assembly therein;
    a centering spring integrally joined with a bearing support member to comprise a one-piece bearing support assembly, the centering spring having both a portion that extends conically relative to a centerline axis of the gas turbine engine and a main body that contacts and extends generally axially along the bearing assembly,
    wherein the bearing support assembly has an upper connection section at an outward radial portion and an intermediate connection section at a middle radial portion,
    wherein the centering spring includes at least one beam that extends conically to a rearward end of the intermediate connection section,
    wherein the main body portion is cylindrical and extends to hold an outer race of the bearing assembly, and
    wherein an outer radial end of the at least one beam is integrally joined to the intermediate connection section of the bearing support assembly; and
    a carbon seal assembly having a forward end connected by a fastener to the bearing support assembly at the intermediate connection section and a seal housing having an outer radial arcuate portion that extends around the bearing assembly.

12. The gas turbine engine of claim 11, wherein the at least one beam is generally aligned with the bearing support member.

13. The gas turbine engine of claim 11, wherein a stiffness of the at least one beam is determined by a number, a size, and a shape.

14. The gas turbine engine of claim 11, wherein the centering spring and bearing support member are integrally joined by machining a single piece stock, by forging, by casting, or by welding.

15. The gas turbine engine of claim 11, wherein an outer race of the bearing assembly is press fit into the main body of the centering spring and is held in place by a nut that fastens to the centering spring and contacts the outer race.

* * * * *